US010577679B1

(12) United States Patent
Wessman et al.

(10) Patent No.: US 10,577,679 B1
(45) Date of Patent: Mar. 3, 2020

(54) GAMMA PRIME STRENGTHENED NICKEL SUPERALLOY FOR ADDITIVE MANUFACTURING

(71) Applicant: General Electric Company, Schenectady, NY (US)

(72) Inventors: Andrew Ezekiel Wessman, Walton, KY (US); Timothy Hanlon, Glenmont, NY (US); Laura Cerully Dial, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/208,827

(22) Filed: Dec. 4, 2018

(51) Int. Cl.
  *C22C 19/05* (2006.01)
  *B22F 3/105* (2006.01)
  *B33Y 70/00* (2020.01)
  *B33Y 80/00* (2015.01)

(52) U.S. Cl.
  CPC .......... *C22C 19/056* (2013.01); *B22F 3/1055* (2013.01); *C22C 19/057* (2013.01); *B22F 2301/15* (2013.01); *B22F 2303/15* (2013.01); *B22F 2999/00* (2013.01); *B33Y 70/00* (2014.12); *B33Y 80/00* (2014.12)

(58) Field of Classification Search
  CPC .... C22C 19/056; C22C 19/057; B22F 3/1055
  See application file for complete search history.

(56) References Cited

U.S. PATENT DOCUMENTS

| | | | |
|---|---|---|---|
| 3,524,774 A | 8/1970 | Parikh | |
| 3,890,816 A | 6/1975 | Allen et al. | |
| 4,169,742 A | 10/1979 | Wukusick et al. | |
| 4,359,352 A | 11/1982 | Ray et al. | |
| 4,461,659 A | 7/1984 | Harris | |
| 4,624,716 A | 11/1986 | Noel et al. | |
| 4,639,352 A | 1/1987 | Kodama et al. | |
| 4,708,750 A | 11/1987 | Field et al. | |
| 4,906,437 A | 3/1990 | Heubner et al. | |
| 5,131,961 A | 7/1992 | Sato et al. | |
| 5,156,808 A | 10/1992 | Henry | |
| 5,413,752 A | 5/1995 | Kissinger et al. | |
| 5,891,272 A | 4/1999 | Raymond et al. | |
| 6,468,368 B1 | 10/2002 | Merrick et al. | |
| 6,495,793 B2 | 12/2002 | Tewari | |
| 6,890,370 B2 | 5/2005 | Merrick et al. | |
| 7,208,116 B2 | 4/2007 | Manning et al. | |
| 7,708,846 B2 | 5/2010 | Malley | |
| 7,780,059 B2 | 8/2010 | Clark | |
| 7,785,427 B2 | 8/2010 | Maziasz et al. | |
| 8,231,730 B2 | 7/2012 | McLean | |
| 8,420,041 B2 | 4/2013 | Hashimoto et al. | |
| 8,506,836 B2 | 8/2013 | Szuromi et al. | |
| 8,640,942 B1 | 2/2014 | Ozbaysal et al. | |
| 8,703,045 B2 | 4/2014 | Mitchell et al. | |
| 8,793,871 B2 | 8/2014 | Morrison et al. | |
| 9,352,421 B2 | 5/2016 | Illston | |
| 9,670,572 B2 | 6/2017 | Etter et al. | |
| 2002/0041821 A1 | 4/2002 | Manning et al. | |
| 2010/0143601 A1 | 6/2010 | Hawtof et al. | |
| 2011/0076179 A1 | 3/2011 | O'Hara et al. | |
| 2012/0201691 A1 | 8/2012 | Dautl et al. | |
| 2013/0071562 A1 | 3/2013 | Szuromi et al. | |
| 2013/0108460 A1 | 5/2013 | Szwedowicz et al. | |
| 2013/0195673 A1 | 8/2013 | Godfrey et al. | |
| 2013/0228302 A1 | 9/2013 | Rickenbacher et al. | |
| 2013/0263977 A1 | 10/2013 | Rickenbacher et al. | |
| 2013/0319580 A1 | 12/2013 | Ozbaysal | |
| 2013/0328975 A1 | 12/2013 | Redding et al. | |
| 2013/0341838 A1 | 12/2013 | Vilaro et al. | |
| 2014/0034626 A1 | 2/2014 | Illston | |
| 2014/0079540 A1 | 3/2014 | Morris et al. | |
| 2014/0163717 A1 | 6/2014 | Das et al. | |
| 2014/0169981 A1 | 6/2014 | Bales et al. | |
| 2014/0170012 A1 | 6/2014 | Delisle et al. | |
| 2014/0209576 A1 | 7/2014 | Ozbaysal et al. | |
| 2014/0209577 A1 | 7/2014 | Bruck et al. | |
| 2014/0216042 A1 | 8/2014 | Hanson | |
| 2014/0220374 A1 | 8/2014 | Bruck et al. | |

(Continued)

FOREIGN PATENT DOCUMENTS

| CA | 2707780 A1 | 12/2010 |
|---|---|---|
| CA | 2878711 A1 | 4/2014 |

(Continued)

OTHER PUBLICATIONS

Harrison, et al., Reduction of micro-cracking in nickel superalloys processed by Selective Laser Melting: A fundamental alloy design approach, ScienceDirect, Acta Materialia, 94, 2015, pp. 59-68. http://dx.doi.org/10.1016/j.actamat.2015.04.035.

DuPont et al., Welding Metallurgy and Weldability of Nickel-Base Alloys, A John Wiley & Sons, Inc., Publication, New Jersey, 2009, 456 Pages. http://sv.20file.org/up1/1068_0.pdf.

Acharya, et al., Additive Manufacturing and Characterization of Rene 80 Superalloy Processed Through Laser Epitaxy for Turbine Engine Hot-Section Component Repair, Advanced Engineering Materials, vol. 7, No. 7, pp. 942-950 (May 15, 2015).

Bi et al., Microstructure and tensile properties of superalloy IN100 fabricated by micro-laser aided additive manufacturing, Science Direct, Materials & Design, vol. 60, 2014, pp. 401-408.

Kelbassa, et al., Manufacture and Repair of Aero Engine Components Using Laser Technology (Invited Paper), Proceedings of the 3$^{rd}$ Pacific International Conference on Application of Lasers and Optics, 2008, pp. 208-213.

(Continued)

*Primary Examiner* — Jessee R Roe
(74) *Attorney, Agent, or Firm* — Dority & Manning, P.A.

(57) ABSTRACT

An additive manufactured product, along with methods of its formation, is provided. The additive manufactured product may include a fused multilayer component comprising a nickel superalloy having a composition comprising, by weight: 7% to 11% of cobalt; 9% to 14% of chromium; 1.5% to 8% of molybdenum; up to 8% of tungsten; 4% to 6% of aluminum; 1% to 4% of titanium; up to 4.6% tantalum; up to 2% hafnium; up to 0.04% zirconium; up to 0.05% carbon; up to 0.04% boron; up to 1% niobium; and the balance nickel along with unavoidable residual elements in trace amounts. This composition may have a sum of the weight percentages of zirconium and boron that is up to 0.06%.

20 Claims, 3 Drawing Sheets

(56) References Cited

U.S. PATENT DOCUMENTS

| | | |
|---|---|---|
| 2014/0248512 A1 | 9/2014 | Kamel et al. |
| 2014/0295087 A1 | 10/2014 | Rickenbacher et al. |
| 2014/0308539 A1 | 10/2014 | Witz et al. |
| 2014/0314581 A1 | 10/2014 | McBrien et al. |
| 2014/0366996 A1 | 12/2014 | Goncharov et al. |
| 2015/0125335 A1 | 5/2015 | Bruck et al. |
| 2015/0322557 A1 | 11/2015 | Etter et al. |
| 2015/0329941 A1 | 11/2015 | Conduit et al. |
| 2015/0344994 A1 | 12/2015 | Etter et al. |
| 2016/0326613 A1 | 11/2016 | Cui et al. |
| 2016/0348216 A1 | 12/2016 | Szuromi et al. |
| 2017/0021415 A1 | 1/2017 | Etter et al. |
| 2017/0021453 A1 | 1/2017 | Engeli et al. |
| 2017/0167000 A1 | 6/2017 | Dial et al. |
| 2017/0209923 A1 | 7/2017 | Giovannetti et al. |
| 2017/0314114 A1 | 11/2017 | Ozbaysal et al. |
| 2017/0356068 A1 | 12/2017 | Engeli et al. |
| 2018/0002785 A1 | 1/2018 | Dial et al. |
| 2018/0195156 A1 | 7/2018 | Reed et al. |

FOREIGN PATENT DOCUMENTS

| | | |
|---|---|---|
| CA | 2898313 A1 | 7/2015 |
| CN | 1871367 A | 11/2006 |
| CN | 1914339 A | 2/2007 |
| CN | 103668461 A | 3/2014 |
| CN | 104313397 A | 1/2015 |
| CN | 104911407 A | 9/2015 |
| EP | 1801251 A1 | 6/2007 |
| EP | 2781691 A1 | 9/2014 |
| EP | 2886225 A1 | 6/2015 |
| JP | S5620345 B1 | 5/1981 |
| JP | 2007277721 A | 10/2007 |
| WO | WO2012/047352 A2 | 4/2012 |
| WO | WO2014/052323 A1 | 4/2014 |
| WO | WO2015/047128 A1 | 4/2015 |
| WO | WO2015/096980 A1 | 7/2015 |

OTHER PUBLICATIONS

Safari et al., On the heat treatment of Rene-80 nickel-base superalloy, Materials Science and Engineering Department, Journal of Materials Processing Technology, 2006, 176, pp. 240-250.

Gu et al., Laser additive manufacturing of metallic components: materials, processes and mechanisms, International Materials Reviews, vol. 57, Issue 3, May 2012, pp. 133-134.

Pollock et al., Nickel-Based Superalloys for Advanced Turbine Engines: Chemistry, Microstructure, and Properties, Journal of Propulsion and Power, vol. 22, Issue No. 2, Mar.-Apr. 2006, 14 Pages.

GAMMA PRIME STRENGTHENED NICKEL SUPERALLOY FOR ADDITIVE MANUFACTURING

FIELD

The present invention relates to the technology of producing three-dimensional articles by powder-based additive manufacturing, particularly with respect to high oxidation resistant and high gamma-prime (γ') precipitation containing Ni-base super-alloy powder with a modified chemical composition for manufacturing of nearly microcrack free components.

BACKGROUND

Direct metal laser melting (DMLM) is generally a commercially available laser-based rapid prototyping and tooling process by which complex components may be directly produced by precision melting and solidification of metal powder into successive deposit layers of larger structures, each deposit layer corresponding to a cross-sectional deposit layer of the 3-dimensional component.

In gas-turbine engines, additively manufactured high temperature capable (e.g., greater than 1500° F.) nickel superalloys offer significant opportunities, such as reduced costs and enhanced design for improved performance and efficiency. However, the current catalog of alloys available for these operating temperatures is both slim and often plagued by their high susceptibility to microcracking during additive manufacturing (AM), especially DMLM from powdered nickel superalloys.

As such, a need exists for improved nickel superalloys, particularly for use in additive manufacturing processes such as DMLM.

BRIEF DESCRIPTION

Aspects and advantages will be set forth in part in the following description, or may be obvious from the description, or may be learned through practice of the invention.

An additive manufactured product is generally provided, along with methods of its formation. In one embodiment, the additive manufactured product includes a fused multilayer component comprising a nickel superalloy having a composition comprising, by weight: 7% to 11% of cobalt; 9% to 14% of chromium; 1.5% to 8% of molybdenum; up to 8% of tungsten; 4% to 6% of aluminum; 1% to 4% of titanium; up to 4.6% tantalum; up to 2% hafnium; up to 0.04% zirconium; up to 0.05% carbon; up to 0.04% boron; up to 1% niobium; and the balance nickel along with unavoidable residual elements in trace amounts. This composition may have a sum of the weight percentages of zirconium and boron that is up to 0.06% (e.g., up to 0.05%, such as 0.01% to 0.04%). For example, the composition may include 0.005% to 0.04% by weight zirconium and/or 0.005% to 0.04% by weight boron, as long as the sum of the weight percentages of zirconium and boron does not exceed 0.06%. In one particular embodiment, the composition may comprise, by weight: 8% to 11% of cobalt; 9% to 12% of chromium; 2% to 6% of molybdenum; 2% to 6% of tungsten; 4% to 6% of aluminum; 1% to 3% of titanium; up to 2% tantalum; up to 2% hafnium; up to 0.03% zirconium; up to 0.04% carbon; up to 0.03% boron; up to 1% niobium; and the balance nickel along with unavoidable residual elements in trace amounts.

In one particular embodiment, an additive manufactured product is provided that includes a fused multilayer component comprising a nickel superalloy having a composition comprising, by weight: 9% to 11% of cobalt; 10% to 12% of chromium; 2.5% to 3.5% of molybdenum; 5.5% to 6% of tungsten; 5% to 6% of aluminum; 1% to 2% of titanium; 0.005% to 0.015% zirconium; 0.01% to 0.03% carbon; 0.005% to 0.015% boron; and the balance nickel, where the fused multilayer component has an areal microcrack density of less than 0.1% (e.g., less than 0.05%).

In certain embodiments, the composition may be substantially free from tantalum; hafnium; niobium, and rhenium. As used herein, the term "substantially free" means no more than an insignificant trace amount may be present that does not alter any characteristic of the composition. The term "substantially free" also encompasses completely free.

Methods are also generally provided for forming an additive manufacturing product. In one embodiment, the method includes forming a layer of powder; bonding a portion of the powder to form a bonded layer portion (e.g., via directing energy onto the powder); and repeating the forming and bonding steps to form a fused multilayer component comprising a plurality of the bonded layer portions. The powder may include a nickel superalloy having any of the compositions described above or below herein. For example, the nickel superalloy may have a composition comprising, by weight: 7% to 11% of cobalt; 9% to 14% of chromium; 1.5% to 8% of molybdenum; up to 8% of tungsten; 4% to 6% of aluminum; 1% to 4% of titanium; up to 4.6% tantalum; up to 2% hafnium; up to 0.04% zirconium; up to 0.05% carbon; up to 0.04% boron; up to 1% niobium; and the balance nickel, with the composition has a sum of the weight percentage of zirconium and boron is up to 0.06%.

In one embodiment, the method may further include heat treating the fused multilayer component to recrystallize at least 50% by volume of the nickel superalloy (e.g., at a heat treatment temperature of 1150° C. or higher). The fused multilayer component may have an areal microcrack density of less than 0.1%.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Figure 1:
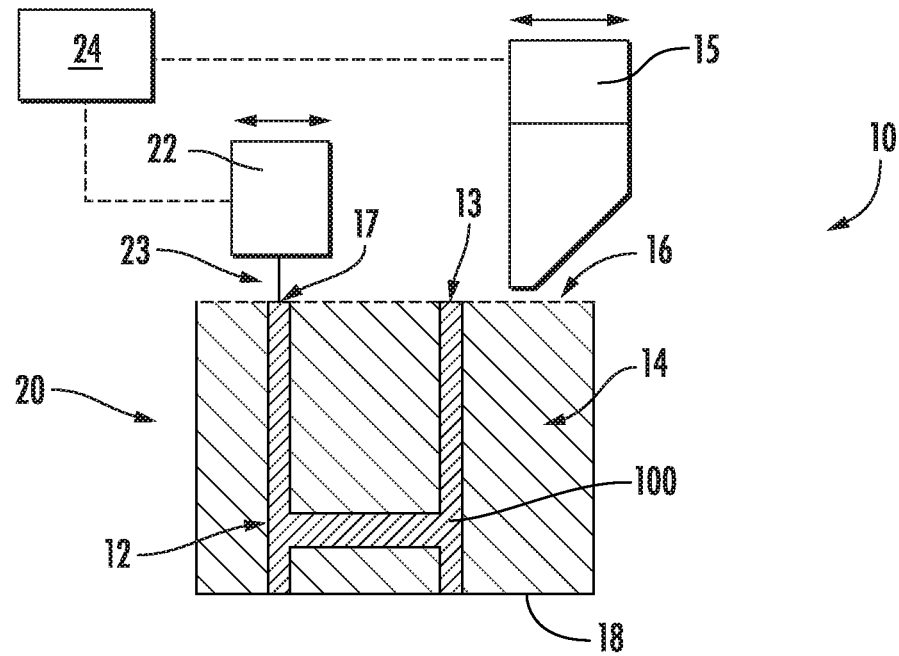
FIG. 1 shows a diagram of an exemplary DMLM apparatus for forming an additive manufacturing product from a powder.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. Unless specified otherwise, all percentages are provided in terms of "weight percent" or "percent by weight."

A gamma prime strengthened nickel superalloy is generally provided that has a composition designed for microcrack resistance of a nickel superalloy component when produced via a DMLM process. In particular, the composition of the nickel superalloy powder has been found to control the microcrack resistance of a resulting component built from the powder in an additive manufacturing process.

Without wishing to be bound by any particular theory, it is believed that the combined amount of Zr and B within the superalloy can impact the microcrack susceptibility of the superalloy during DMLM. For example, it has been found that as the combined amount of Zr and B increases within the superalloy, the microcrack susceptibility of the superalloy also increases during DMLM. Thus, a combined amount of Zr and B is desirably relatively low in the superalloy, such as up to 0.06% by weight (e.g., up to 0.05% by weight, such as up to 0.04% by weight). However, Zr and B have an effect on grain boundary strength, so this combination is positive in particular embodiments, such as a combined amount of Zr and B of greater than 0 to 0.06% by weight. Additionally, it has been found that the combined amount of Zr and B was a significant factor in that lower values produced more buildable compositions, but in certain embodiments the combined amount is non-zero to provide adequate levels of grain boundary strengthening as needed, such as greater than 0 to 0.06% by weight (e.g., greater than 0 to 0.05% by weight, such as about 0.01% by weight to 0.04% by weight).

Additionally, without wishing to be bound by any particular theory, it is also believed that the Mo/W ratio within the superalloy serves to control the as-built microcrack resistance of the component. As such, Mo and W may be included in the superalloy at concentrations that help balance strength and microcrack resistance. For instance, Mo may be included in the superalloy composition in an amount, by weight, of 1.5% to 8% (e.g., 2% to 6%, such as 5% to 6%), and W may be included in the superalloy composition in an amount, by weight, of up to 8% (e.g., greater than 0% to 8%, such as 2% to 6%, and including 5% to 6%). In one embodiment, the nickel superalloy has a composition with a weight ratio of molybdenum to tungsten (Mo/W weight ratio) of 0.25 to 2, such as 0.25 to 1 (e.g., 0.25 to 0.55). As used herein, the Mo/W weight ratio is calculated by dividing the weight percentage of Mo in the composition by the weight percentage of W in the composition.

As such, additive manufacturing products are provided that are formed from fused multilayers of a nickel superalloy powder. For example, the fused multilayer component may have an areal microcrack density that is less than 0.1% (e.g., less than 0.05%). As used herein, the "areal microcrack density" is a measurement of the area of the microcracks in a representatively sized cross section area parallel to the build direction, where a representative size is at least 60 square millimeters (sq. mm). In other words, the "areal microcrack density" is a measurement of the area of microcracks divided by area of measurement expressed as a percentage in a planar cross-section of the fused multilayer component that is parallel to the build direction of the fused multilayer component. As used herein, "microcracks" are fine cracks in the microstructure of the produce that are not visible by eye or must be visualized under a microscope.

In one embodiment, the nickel superalloy has a composition comprising, by weight: 7% to 11% of cobalt (e.g., 8% to 11% of cobalt); 9% to 14% of chromium (e.g., 9% to 12% of chromium); 1.5% to 8% of molybdenum (e.g., 2% to 6% of molybdenum); up to 8% of tungsten (e.g., 0.5% to 8% tungsten, such as 2% to 6% of tungsten); 4% to 6% of aluminum (e.g., 5% to 6% of aluminum); 1% to 4% of titanium (e.g., 1% to 3% of titanium); up to 4.6% tantalum (e.g., up to 2% tantalum); up to 2% hafnium (e.g., up to 1% hafnium); up to 0.04 zirconium (e.g., up to 0.03% zirconium); up to 0.05% carbon (e.g., up to 0.04% carbon); up to 0.04 boron (e.g., up to 0.03 boron); up to 1% niobium; and the balance nickel (e.g., greater than 50% of Ni). Without wishing to be bound by any particular theory, the present inventors unexpectedly found that nickel superalloys having these particular compositions and having a combined amount of Zr and B that is up to 0.06% (e.g., up to 0.05%, such as 0.01% to 0.04%) may lead to AM products having acceptable levels of microcracking. On the other hand, nickel superalloys having these compositions but with a combined amount of Zr and B above 0.06 tend to microcrack unacceptably.

In particular embodiments, the nickel superalloy has a composition comprising, by weight: 9% to 11% of cobalt; 10% to 12% of chromium; 2.5% to 3.5% of molybdenum; 5.5% to 6.0% of tungsten; 5% to 6% of aluminum (Al); 1% to 2% of titanium (Ti); up to 0.03% zirconium (e.g., 0.005% to 0.015% Zr); up to 0.05% carbon (e.g., 0.01% to 0.04% carbon, such as 0.01% to 0.03% carbon); up to 0.03% boron (e.g., 0.005% to 0.015% B); and the balance Ni.

Generally, it is believed that Cr provides corrosion resistance to the superalloy at concentrations above about 9% by weight (e.g., 9% to 14% of chromium, such as 9% to 12% of chromium). Al and Ti are believed to be included in the superalloy at concentrations that help with strength, particularly with precipitate phase strengthening of the superalloy. For instance, Al may be included in the superalloy composition in an amount, by weight, of 4% to 6% (e.g., 5% to 6%), and Ti may be included in the superalloy composition in an amount, by weight, of 1% to 4% (e.g., 1% to 3%, such as 1% to 2%).

Similarly, C is believed to be included in the superalloy at concentrations that affect precipitate phase strengthening, and when present may be present in a concentration of greater than 0% to 0.05% of carbon (e.g., greater than 0% to 0.04% of carbon, such as 0.01% to 0.03% of carbon). For example, upon formation through an AM process (such as DMLM), the AM product formed from an alloy that includes a non-zero amount of carbon may include, when viewing a plane parallel to the build direction, an array of carbides distributed in a manner that is highly correlated with the build direction (or direction of layer build-up). That is, the array of carbides may be distributed along lines substantially parallel to the build direction. By comparison, conventionally made components (i.e., not formed in a layer-by-layer AM process) would have carbides having a relatively more random distribution regardless of what plane you are viewing. Without wishing to be bound by any particular theory, it is believed that these carbide phase particulates become disposed within the alloy due to the rapid solidification and cooling rate characteristic of the additive manufacturing process. In generally, these carbide phase particulates are primary phase particulates in that the phase is formed during solidification, in contrast to secondary phases, which form during subsequent processing steps such as heat treatment. These primary carbide phase particulates are useful strengthening phases when their size, morphology, and phase fraction are maintained in an appropriate range. In some embodiments, the plurality of primary carbide phase particulates has a median size less than about 1 micrometer (μm), and in particular embodiments, this median size is less than about 300 nanometers (nm). The rapid solidification and cooling rates that are characteristic of DMLM and other additive manufacturing methods help to maintain fine carbide particulate size.

In particular embodiments, hafnium (Hf) is included to add oxidation resistance. For example, it appears that Hf improves the buildability of the composition in some instances. However, some embodiments are substantially free of Hf, such as to reduce cost or balance other properties of the composition. Thus, the ranges of each element of the superalloy are particularly set forth for a particular purpose or characteristic in the resulting superalloy.

The nickel superalloy has, in one embodiment, a composition consisting essentially of, by weight: 7% to 11% of cobalt (e.g., 8% to 11% of cobalt); 9% to 14% of chromium (e.g., 9% to 12% of chromium); 1.5% to 8% of molybdenum (e.g., 2% to 6% of molybdenum); 0.05% to 8% of tungsten (e.g., 0.5% to 8% tungsten, such as 2% to 6% of tungsten); 4% to 6% of aluminum (e.g., 5% to 6% of aluminum); 1% to 4% of titanium (e.g., 1% to 3% of titanium); up to 4.6% tantalum (e.g., up to 2% tantalum); up to 2% hafnium; up to 0.04 zirconium (e.g., up to 0.03% zirconium); up to 0.05 carbon (e.g., up to 0.04% carbon); up to 0.04 boron (e.g., up to 0.03 boron); and the balance Ni along with unavoidable residual elements in trace amounts. As used herein, the phrase "consisting essentially of" refers the composition described, but without any additional element that would alter the characteristics described herein (i.e., the susceptibility of microcracking of the composition during DMLM). In one particular embodiment, for example, the nickel superalloy is substantially free from Ta, Hf, Nb, and/or rhenium (Re). For example, the composition may consist essentially of, by weight: 7% to 11% of cobalt (e.g., 8% to 11% of cobalt); 9% to 14% of chromium (e.g., 9% to 12% of chromium); 1.5% to 8% of molybdenum (e.g., 2% to 6% of molybdenum); 0.05% to 8% of tungsten (e.g., 0.5% to 8% tungsten, such as 2% to 6% of tungsten); 4% to 6% of aluminum (e.g., 5% to 6% of aluminum); 1% to 4% of titanium (e.g., 1% to 3% of titanium); up to 0.04 zirconium (e.g., up to 0.03% zirconium); up to 0.05 carbon (e.g., up to 0.04% carbon); up to 0.04 boron (e.g., up to 0.03 boron); and the balance Ni along with unavoidable residual elements in trace amounts. For instance, in one particular embodiment, the composition consists essentially of, by weight: 9% to 11% of cobalt; 10% to 12% of chromium; 2.5% to 3.5% of molybdenum; 5.5% to 6% of tungsten; 5% to 6% of aluminum; 1% to 2% of titanium; up to 0.015 of zirconium (e.g., 0.005% to 0.015% zirconium); 0.01% to 0.03% of carbon; up to 0.015 of boron (e.g., 0.005% to 0.015% boron); and the balance Ni along with unavoidable residual elements in trace amounts.

In one embodiment, the nickel superalloy is provided in powder form having an average powder size of about 10 μm to about 100 μm. For example, the powder may be formed via gas atomization or plasma atomization techniques.

As discussed above, the powders of nickel superalloy compositions are particularly suitable for forming components via additive manufacturing, such as direct metal laser melting (DMLM) processes, direct metal laser sintering (DMLS) processes, selective laser melting (SLM), selective laser sintering (SLS), etc. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter, at least partially melt, or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 µm and 200 µm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 µm, utilized during the additive formation process.

In addition, utilizing an additive process, the surface finish and features of the components may vary as needed depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral mounting features. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved functionality and reliability.

DMLM is an additive manufacturing process that uses lasers to melt ultra-thin layers of metal powder to build a three-dimensional object in a layer-by-layer process. Objects are built directly from CAD (computer-aided design) data. The use of a laser to selectively melt thin layers of fine metal particles yields objects exhibiting fine, dense and homogeneous characteristics. Generally, the DMLM process begins with a recoater spreading a thin layer of metal powder on the print bed. Next, a controller directs a laser, according to the CAD data stored within the controller, to create a cross-section of the object by melting metal particles. The print bed is then lowered so the process can be repeated to create the next object layer. After all layers are printed, the excess unmelted powder is removed, generally by brushing, blowing, or blasting away the powder. The object typically requires little, if any, finishing.

The DMLS process is similar to DMLM, but uses lasers to partially melt particles so they adhere to one another. The term "DMLS" is often used to refer to both processes, although the term "DMLM" is gradually emerging as the preferred way to reference the process when complete melting occurs.

FIG. 1 shows a schematic of an exemplary AM system 10 (e.g., a DMLM system) for forming an additive manufacturing product 12 from a powder 14. For example, a layer 16 of powder 14 (e.g., from powder supply 15) may be applied over the build plate 18 within a build area 20. Then, an energy source 22 may bond a portion 13 of the layer 16 of powder 14 to form a bonded layer portion 17. For example, the energy source 22 may direct energy 23 (e.g., electromagnetic radiation, such as in the form of a laser) to bond particular portions 13 of the layer 16 of the powder 14. For example, bonding the portion 13 of the layer 16 of the powder 14 may be achieved by directing energy 23 to at least partially melt the portion 13 of the powder 14 to form the bonded layer portion 17. In one embodiment, energy 23 is applied according to a CAD model preloaded in a controller 24 that is in communication with the powder supply 15 and the energy source 22. This process can be repeated by forming an additional layer of powder and then bonding a portion of that additional layer of powder until a fused multilayer component 100 is formed.

Figure 2:
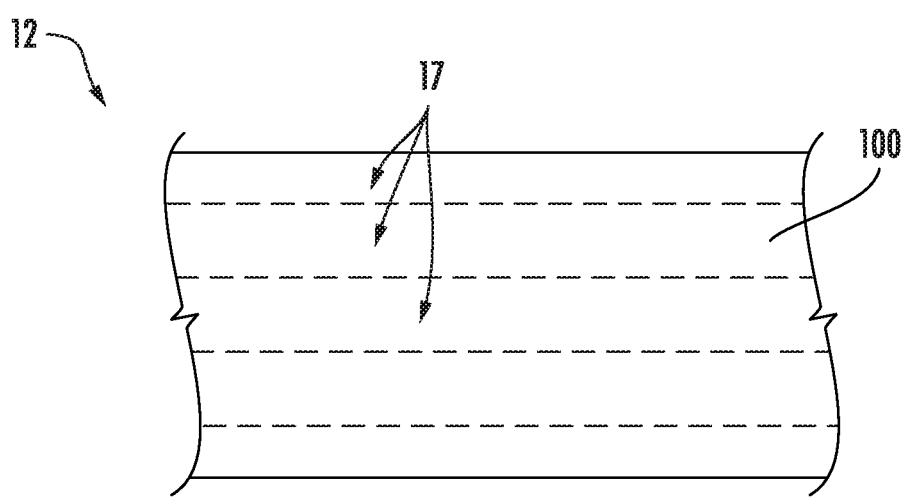
FIG. 2 shows a cross-sectional view of an exemplary additive manufacturing product in the form of a fused multilayer component.

FIG. 2 shows a fused multilayer component 100 that was formed from a plurality of bonded layer portions 17. In particular embodiments, the fused multilayer component 100 may be heat treated to recrystallize at least about 50% by volume (e.g., greater than 50% by volume) of the nickel superalloy. For example, the fused multilayer component 100 may be heat treated at a temperature of 1150° C. or greater.

Example 1

The experimental composition had higher Cr, Mo, Ti and lower Mo than a nickel superalloy available commercially as Rene 108 (R108). These elements appeared to be significant factors in determining overall ability to build, but the mechanism underlying these effects remains unclear and may be due to complicated interactions among these elements.

Rene 108 was compared to several different Examples according to the present disclosure, with the compositions set forth below in Table 1:

TABLE 1

| Alloy | Ni | Co | Cr | Mo | W | Al | Ti | Ta | Hf | Zr | C | B |
|---|---|---|---|---|---|---|---|---|---|---|---|---|
| R108 family | Bal. | 9.5-10.1 | 8.3-9.3 | 0.5-1.5 | 9.5-11 | 5.5-5.7 | 0.4-0.7 | 0-3.5 | 0-1.5 | 0.015 | 0.03-0.09 | 0.015 |
| Ex. 1 | Bal. | 9-11 | 10-12 | 2.5-3.5 | 5-5.6 | 5-6 | 1-2 | 0 | 0 | 0-0.015 | 0.01-0.03 | 0-0.015 |

Figure 3:
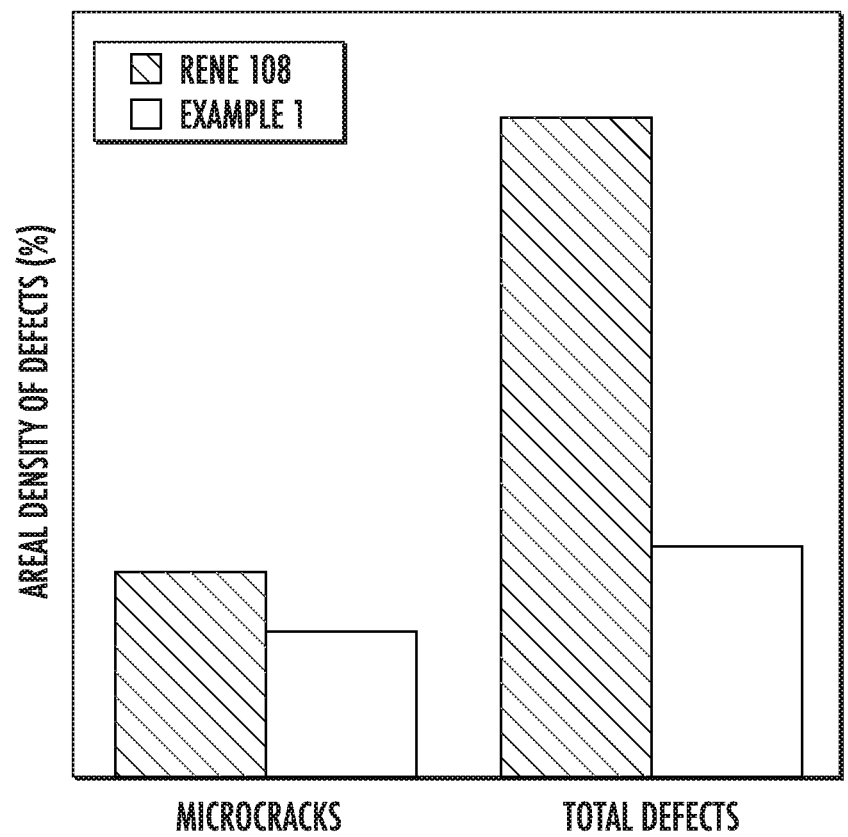
FIG. 3 shows the areal density of the microcracks and total defects of experimental superalloys compared to a Rene 108 alloy according to Example 1.

Powders having the compositions according to Example 1 (Ex. 1 in Table 1) and Rene 108 were used in a DMLM process to build a series of test specimens. The experimental composition notably has higher Cr, Mo, and Ti, and lower W, than nominal Rene 108-type alloys. Then, the specimens were evaluated for microcracks and other defects (including porosity) by examining a plane parallel to the build direction using optical microscopy. The experimental alloy demonstrated significantly lower microcrack density and density of overall defects compared with the baseline Rene 108 alloys, as demonstrated in FIG. 3.

Example 2

Figure 4:
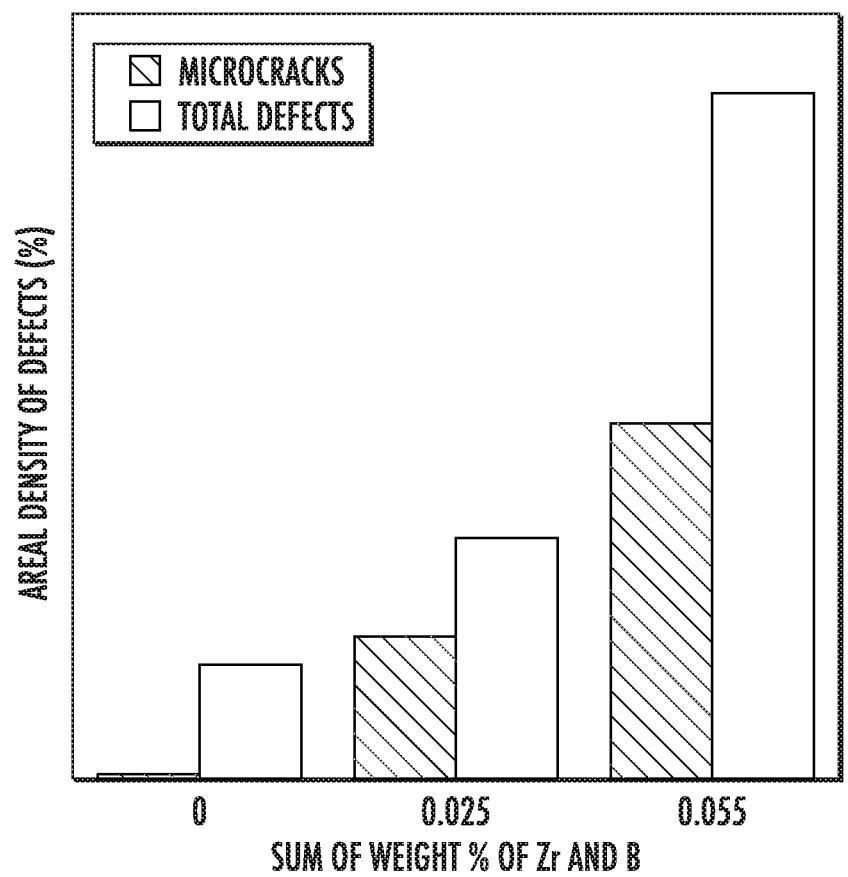
FIG. 4 shows the areal density of the microcracks and the total defects (i.e., porosity and microcracks) of experimental superalloys with varying weight percentages of Zr and B according to Example 2.

Alloys having compositions in accordance with the embodiments described above with respect to Example 1, but with different values of the sum of the weight percentages of zirconium and boron, were used to build test specimens and then evaluated for microcracks and total defects. The results are illustrated in FIG. 4. A clear rising trend in defect occurrence was observed with increasing sum of the weight percentages of Zr and B.

Thus, it was found that as the sum of the weight percentages of Zr and B increased, the microcrack susceptibility of the alloy during DMLM also increased. It is believed that lowering the sum of the weight percentages of Zr and B improved the composition for DMLM; however, the presence of these elements affects grain boundary strength. Thus, the sum of the weight percentages of Zr and B is greater than 0 in certain embodiments. It was also demonstrated that, all other alloying elements kept constant, as the Mo/W ratio is decreased from 2 to 0.5, the microcrack resistance of the alloy improves.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufactured product, comprising:
a fused multilayer component comprising a nickel superalloy, wherein the nickel superalloy has a composition comprising, by weight:
7% to 11% of cobalt;
9% to 14% of chromium;
1.5% to 8% of molybdenum;
up to 8% of tungsten;
4% to 6% of aluminum;
1% to 3% of titanium;
up to 4.6% tantalum;
up to 2% hafnium;
up to 0.04% zirconium;
up to 0.05% carbon;
up to 0.04% boron;
up to 1% niobium;
and the balance nickel along with unavoidable residual elements in trace amounts, wherein the composition has a sum of the weight percentage of zirconium and boron that is up to 0.06%.

2. The additive manufacturing product as in claim 1, wherein the sum of the weight percentage of zirconium and boron is up to 0.05%.

3. The additive manufacturing product as in claim 1, wherein the sum of the weight percentage of zirconium and boron is 0.01% to 0.04%.

4. The additive manufacturing product as in claim 1, wherein the composition includes 0.005% to 0.04% by weight zirconium.

5. The additive manufacturing product as in claim 1, wherein the composition includes 0.005% to 0.04% by weight boron.

6. The additive manufacturing product as in claim 1, wherein the composition comprises, by weight:
8% to 11% of cobalt;
9% to 12% of chromium;
2% to 6% of molybdenum;
2% to 6% of tungsten;
4% to 6% of aluminum;
1% to 3% of titanium;
up to 2% tantalum;
up to 2% hafnium;
up to 0.03% zirconium;
up to 0.04% carbon;
up to 0.03% boron;
up to 1% niobium;
and the balance nickel along with unavoidable residual elements in trace amounts.

7. The additive manufacturing product as in claim 1, wherein the composition comprises, by weight, greater than 0 to about 0.03% carbon.

8. The additive manufacturing product as in claim 1, wherein the composition is substantially free from tantalum, hafnium, niobium, and rhenium.

9. The additive manufacturing product as in claim 1, wherein the composition has a weight ratio of molybdenum to tungsten (Mo/W) of 0.25 to 2.

10. The additive manufacturing product as in claim 1, wherein the composition has a weight ratio of molybdenum to tungsten (Mo/W) of 0.25 to 1.

11. The additive manufacturing product as in claim 1, wherein the fused multilayer component has an areal microcrack density of less than 0.1%.

12. The additive manufacturing product as in claim 1, wherein the fused multilayer component has an areal microcrack density of less than 0.05%.

13. The additive manufacturing product as in claim 1, wherein the composition consists essentially of, by weight:
7% to 11% of cobalt;
9% to 14% of chromium;
1.5% to 8% of molybdenum;
0.05% to 8% of tungsten;
4% to 6% of aluminum;
1% to 3% of titanium;
up to 0.04% zirconium;
up to 0.05% carbon;
up to 0.04% boron; and
the balance Ni along with unavoidable residual elements in trace amounts.

14. An additive manufactured product, comprising:
a fused multilayer component comprising a nickel superalloy, wherein the nickel superalloy has a composition comprising, by weight:
9% to 11% of cobalt;
10% to 12% of chromium;
2.5% to 3.5% of molybdenum;
5.5% to 6% of tungsten;
5% to 6% of aluminum;
1% to 2% of titanium;
0.005% to 0.015% zirconium;
0.01% to 0.03% carbon;
0.005% to 0.015% boron;
and the balance nickel,
wherein the fused multilayer component has an areal microcrack density of less than 0.1%.

15. The additive manufacturing product as in claim 14, wherein the composition is substantially free from tantalum; hafnium; niobium, and rhenium.

16. A method of forming an additive manufacturing product, the method comprising:
forming a layer of powder;
bonding a portion of the powder to form a bonded layer portion; and
repeating the forming and bonding steps to form a fused multilayer component comprising a plurality of the bonded layer portions,
wherein the powder comprises a nickel superalloy having a composition comprising, by weight:
7% to 11% of cobalt;
9% to 14% of chromium;
1.5% to 8% of molybdenum;
up to 8% of tungsten;
4% to 6% of aluminum;
1% to 3% of titanium;
up to 4.6% tantalum;
up to 2% hafnium;
up to 0.04% zirconium;
up to 0.05% carbon;
up to 0.04% boron;
up to 1% niobium;
and the balance nickel,
wherein the composition has a sum of the weight percentage of zirconium and boron is up to 0.06%.

17. The method as in claim 16, wherein the composition includes 0.005% to 0.04% by weight zirconium, and wherein the composition includes 0.005% to 0.04% by weight boron.

18. The method as in claim 16, further comprising:
heat treating the fused multilayer component to recrystallize at least 50% by volume of the nickel superalloy, and wherein the fused multilayer component has an areal microcrack density of less than 0.1%.

19. The method as in claim 18, wherein the fused multilayer component is heat treated at a temperature of 1150° C. or higher.

20. The method as in claim 16, wherein bonding the portion of the powder comprises directing energy onto the powder to at least partially melt the portion of the powder to form the bonded layer portion.

* * * * *